United States Patent
Kelley et al.

(10) Patent No.: US 7,837,121 B2
(45) Date of Patent: Nov. 23, 2010

(54) SECURE CREDIT CARD ADAPTER

(75) Inventors: Edward E. Kelley, Wappingers Falls, NY (US); Franco Motika, Hopewell Junction, NY (US); Kim H. Ruffing, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/427,148

(22) Filed: Jun. 28, 2006

(65) Prior Publication Data

US 2006/0237529 A1   Oct. 26, 2006

Related U.S. Application Data

(62) Division of application No. 10/907,207, filed on Mar. 24, 2005, now Pat. No. 7,128,273.

(51) Int. Cl.
G06K 5/00 (2006.01)
G06K 7/01 (2006.01)
G06K 7/00 (2006.01)
G06K 19/06 (2006.01)
G06F 21/00 (2006.01)
G06Q 20/00 (2006.01)

(52) U.S. Cl. .................. 235/492; 235/486; 235/382; 235/380; 235/382.5; 705/51; 705/64

(58) Field of Classification Search ............... 364/408; 235/380, 492, 382, 382.5, 486; 705/51, 64
See application file for complete search history.

(56) References Cited

U.S. PATENT DOCUMENTS

| | | | | |
|---|---|---|---|---|
| 4,048,475 A * | 9/1977 | Yoshida | ........................ | 235/380 |
| 4,549,075 A * | 10/1985 | Saada et al. | .................. | 235/380 |
| 4,802,218 A * | 1/1989 | Wright et al. | ................ | 235/380 |
| 4,837,422 A | 6/1989 | Dethloff et al. | | |
| 4,961,142 A * | 10/1990 | Elliott et al. | .................. | 235/380 |
| 5,220,157 A * | 6/1993 | Martin et al. | ................ | 235/379 |
| 5,868,236 A * | 2/1999 | Rademacher | ................ | 194/217 |
| 6,112,981 A * | 9/2000 | McCall | ........................ | 235/375 |
| 6,526,130 B1 * | 2/2003 | Paschini | ................... | 379/93.12 |
| 6,588,664 B2 * | 7/2003 | Davies | .................. | 235/462.01 |
| 6,641,050 B2 | 11/2003 | Kelley et al. | | |
| 6,679,775 B1 * | 1/2004 | Luciano et al. | ................ | 463/25 |
| 6,758,393 B1 * | 7/2004 | Luciano et al. | ............. | 235/379 |
| 7,083,081 B2 * | 8/2006 | McGee et al. | ................ | 235/375 |

(Continued)

*Primary Examiner*—Thien M. Le
*Assistant Examiner*—Thien T Mai
(74) *Attorney, Agent, or Firm*—Whitham, Curtis, Christofferson & Cook, P.C.; Ronald A. Kaschak

(57) ABSTRACT

A secure card adapter provides for writing of highly secure, single transaction information on a machine-readable medium of a card structure in accordance with a format that may be downloaded from an external data source. The card structure may be, for example, an existing access authorization card or an existing credit card containing account-specific information which can be read and stored in memory of the secure card adapter. Once such account-specific information is read from an existing access authorization or credit card, secure transaction information can be written, together with the account specific information in accordance with the downloaded format information on another card structure to provide a universal access authorization and/or credit card. Thus the secure card adapter provides an enhanced degree of security through an existing or transitional communication infrastructure.

4 Claims, 3 Drawing Sheets

U.S. PATENT DOCUMENTS

2002/0123967 A1* 9/2002 Wang .................... 705/51
2003/0001005 A1* 1/2003 Risafi et al. ............. 235/380
2003/0179078 A1 9/2003 Chen et al.

* cited by examiner

SECURE CREDIT CARD ADAPTER

CROSS-REFERENCE TO RELATED APPLICATIONS

This application is a division of U.S. patent application Ser. No. 10/907,207, filed Mar. 24, 2005, priority of which is hereby claimed, now U.S. Pat. No. 7,128,273, issued Oct. 31, 2006.

Background of the Invention

1. Field of the Invention

The present invention generally relates to so-called smart cards and, more particularly, to alternative uses of highly secure credit card-like structures, especially for providing such functions through existing credit card transaction infrastructure.

2. Description of the Prior Art

Proliferation of fraudulent activities such as identity theft, often facilitated by streamlining of electronic financial transactions and the proliferation of credit and debit cards often used in such transactions, has led to great interest in techniques for improving security and authentication of the identity of a user of such credit and debit cards. In particular, the streamlining of transactions has led to the proliferation of credit card readers which read information from a magnetic stripe formed on a surface of a credit card and which are often integrated with point-of-sale terminals such as cash registers and fuel pumps. In such cases, it is often left to the customer to manipulate the card through the reader where the card is read and, in some cases, the read information is used to automatically print a memorandum of the transaction for signature by the customer to complete the transaction. In other cases, such as transactions at fuel pumps, no action need be taken by sales personnel at all and the transaction is completed automatically based only on the information read from the credit card and with no verification of customer identity. In such streamlining of transactions the principal amount of time and effort saved is at the expense of the small and possibly unreliable but very important safeguard provided by the opportunity for sales personnel to at least compare the signature of a customer on a sales memorandum with the signature on the credit card to authenticate customer identity and possibly detect unauthorized use of the credit card. Nevertheless, loss of this important security feature is evidently considered by the public, merchants and financial institutions to be more than balanced by the capability for worldwide, near real-time tracking of credit card use and usage profiling provided by the reading of credit card data and immediate communication to financial institutions to accept or reject any individual transaction as well as the expediting of transactions and the continuity of possession of the credit card by the customer. On the other hand, the monitoring of credit card transactions and transaction profiling may also cause rejection of transactions which are, in fact, legitimate such as those of a person who may travel only infrequently, causing attempted transactions while traveling to be rejected since the identity of the credit card user cannot be authenticated based on magnetic stripe information. Thus, temporally proximate transactions at remote locations, as might occur due to transactions immediately before and after air travel, may lead to an inference of credit card theft or other fraudulent activity.

Recent advances in semiconductor technology, particularly extremely thin substrates, has also allowed chips to be fabricated with substantial mechanical flexibility and robustness adequate for inclusion of electronic circuits of substantial complexity within conveniently carried cards physically similar to credit cards currently in use. Such technology has also allowed records of substantial information content to be similarly packaged and associated with various articles, animals or persons such as maintenance records for motor vehicles or medical records for humans or animals. In regard to increase of security for financial transactions however, various attempts to increase security through improved identity authentication or disablement in case of theft or other misuse, while large in number and frequently proposed, have not, until recently, proven adequate for the purpose.

However, a highly secure credit or debit card design has been recently invented and is disclosed in U.S. Pat. No. 6,641,050 B2, issued Nov. 4, 2003, and assigned to the assignee of the present invention, the entirety of which is hereby fully incorporated by reference for details of implementation thereof. In summary, the secure credit/debit card disclosed therein includes a keyboard or other selective data entry device, a free-running oscillator, an array of electronic fuses (e-fuses) or other non-volatile memory, a processor, a pair of linear feedback shift registers (LFSRs) and a transmitter/receiver to allow communication with an external card reader. The card is uniquely identified by a unique identification number, preferably stored in the card by the programming of e-fuses and the programming of additional e-fuses which control feedback connections for each of the LFSRs, one of which is used as a reference and the other is used in the manner of a pseudo-random number generator. The programming of the e-fuses to record the card identification code and to establish unique sets of feedback connections for the LFSRs is referred to as a pre-initialized personality configuration for the card. The card is activated only for short periods of time sufficient to complete a transaction by entry of a personal identification number (PIN) that can also be permanently programmed into the card. When the card is activated and read by a card reader, the two sequences of numbers generated by the LFSRs are synchronously generated and a portion thereof is communicated to a reader which not only authenticates the number sequences against each other and the card identification number but also rejects the portion of the sequence if it is the same portion used in a previous transaction in order to guard against capture of the sequences by another device to simulate the operation of a secure card. This system provides combined authentication of the holder/user and the card, itself, together with encryption of transaction information unique to each card which renders the card useless if stolen while providing highly effective protection against simulation and/or duplication of the card or capture of information from it.

However, in its preferred form and to obtain the highest levels of security, a special reader including a complementary receiver and transmitter is required to, in effect, allow direct communication in real-time between the secure credit card and the secure card authentication processor at the financial institution. While such special readers may be manufactured in quantity and distributed at relatively low cost and do not require a change in the communication system for reporting authentication and transaction information to a financial institution, current magnetic stripe readers are so ubiquitous and numerous worldwide as to represent an extremely large capital expenditure to which the cost of replacement of special card readers adapted to the secure credit card of the above-incorporated patent would be comparable. Further, even if cost was not an unavoidable practical consideration, replacement of the billions of credit cards and millions of credit card magnetic stripe readers now in use would require an extended period of time during which both magnetic stripe readers and secure credit card readers would be required, in parallel, at point-of-sale terminals.

SUMMARY OF THE INVENTION

It is therefore an object of the present invention to provide an adapter to allow the principal meritorious effects of the secure credit card of the above-incorporated patent to be provided through magnetic stripe credit card readers and the current transaction reporting and authorization infrastructure.

It is a another object of the invention to provide security enhancements for magnetic stripe credit cards currently in use.

It is a further object of the present invention to provide a transitional system between the current transaction reporting and authentication infrastructure to an infrastructure appropriate to the secure credit card of the above-incorporated patent.

In order to accomplish these and other objects of the invention, a secure card adapter is provided comprising a card body which incorporates a microprocessor device, a read only memory device and a secure linear feedback shift register, the microprocessor device being interfaced to the read only memory device containing a pre-initialized personality configuration being comprised of both a unique card identification and a customized secure linear feedback shift register initial configuration, a reference linear feedback shift register incorporated in the card body and synchronized to the secure linear feedback shift register, a security code generator incorporated in the card body and producing a security code utilizing the secure linear feedback shift register, the secure linear feedback shift register being driven by a common free-running clock oscillator and providing outputs which, when combined with the card identification, produce a security code uniquely based upon the pre-initialized personality configuration, the security code being accessible by the microprocessor, a communication interface incorporated in said card body and connected to the microprocessor device, the communication device providing an input/output message function of the secured information between the microprocessor and an agent outside said secure card body; and an arrangement for writing unique transaction information on a machine-readable medium on a card structure.

In accordance with another aspect of the invention, a method of writing secure information to a machine-readable medium of a card is provided comprising steps of authenticating a user to a secure card adapter, reading account-specific information from memory of the secure card adapter or from a machine readable medium on a card inserted into the secure card adapter, generating secure transaction information, and writing at least the secure transaction information on a machine readable medium of a card.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

It should be recognized that while the preferred environment and use of the present invention is in connection with financial transactions in a manner similar to the well-known use of credit or debit cards, such card structures may be used for many purposes such as personal identification and for obtaining controlled access to secure areas or apparatus such as machinery or data processing systems or resources; exemplary types of which are discussed in U.S. patent application Ser. No. 10/906,692, filed Mar. 2, 2005, assigned to the assignee of the present invention and hereby fully incorporated by reference. It is therefore to be understood that the term "credit card" as used hereinafter is intended to comprehend and be a collective reference to all such and similar uses of structures having a readable magnetic medium thereon. Similarly, references to a magnetic stripe is intended to comprehend all other shapes and formats of such a machine-readable magnetic or optical medium such as a displayed bar code.

Figure 1:
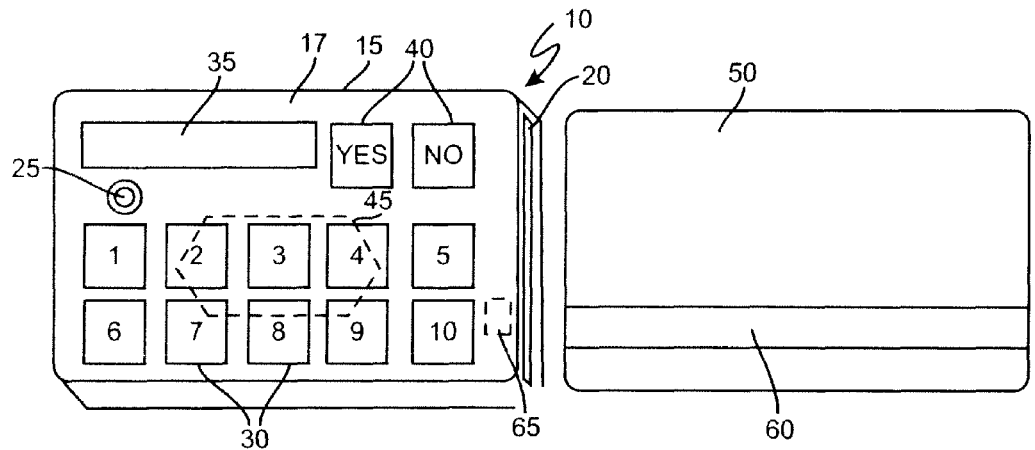
FIG. 1 is an illustration of a secure credit card holder/adapter in accordance with the present invention.

Referring now to the drawings, and more particularly to FIG. 1, there is shown a preferred embodiment of a secure credit card holder/adapter, sometimes referred to as a "safe guard pack", 10 in accordance with the invention. (As a matter of terminology, the invention is also accurately referred to as a credit card adapter since it provides the capability of adapting an existing credit card for use with the system of the secure credit card of the above-incorporated U.S. Pat. No. 6,641,040 and will be referred to hereinafter as a holder/adapter to distinguish from references to a user who may be properly referred to as a "holder" and which may be referred to as a "user/holder" of the credit card since ownership of the card is customarily maintained by the issuing company.) The card holder/adapter 10 comprises a housing 15 which, as will be evident from the following discussion, can be fabricated to have a thickness only slightly greater than the thickness of a secure credit card and an ordinary magnetic stripe credit card and thus can be conveniently carried in virtually any manner desired (e.g. in a wallet) for any ordinary credit card. Housing 15 includes a slot 20 suitable to receive an ordinary magnetic stripe credit card or a similar structure 50 which may be provided with card holder/adapter 10. Housing 15 also includes a connector, preferably of the type used with standard universal serial bus (USB) ports, a group of data entry keys 30, a display 35 and further control keys 40. Data entry keys 30 and control keys 40 are preferably of the membrane type in order to avoid increasing the thickness of the housing 15 and to provide a robust structure that is not easily damaged. Display 35 is preferably of the liquid crystal type for the same reasons.

The internal electronics of the card holder/adapter 10 (schematically indicated by dashed line 45) are preferably all contained within the front panel 17 of housing 15. These internal electronics, with the exception of the use of a magnetic recording head 65 and driver therefor rather than a transmitter and receiver and antenna as in the above-incorporated U.S. Pat. No. 6,641,050, are preferably identical to the internal electronics of the secure credit card disclosed in the above-incorporated patent and thus the front panel 17 of the housing 15 can be of comparable thickness. The sides/edges and rear panel of housing 15 thus do not need to provide any function other than holding and precisely locating magnetic stripe structure 50 when placed in slot 20 and thus can be made very thin of substantially any non-magnetic material.

The method of operation of credit card holder/adapter 10 may be substantially identical to that described in the above-incorporated patent and/or U.S. patent application Ser. No. 10/905,716, filed Jan. 18, 2005, assigned to the assignee of the present invention and hereby fully incorporated by reference, and thus need not be described in detail herein. Essentially, the user of the secure credit card and/or card holder/adapter 10, authenticates himself or an authorized person to the secure credit card or card holder/adapter 10 by entry of a personal identification number (PIN) or the like in order to initiate generation of signals to authenticate both the secure credit card or card holder/adapter 10 and the user to a secure card processor for a single transaction through generation of unique identification information and two synchronized pseudo-random signal sequences which would be extremely difficult to duplicate. Use of captured pseudo-random sequences can be readily detected and rejected by the simple expedient of providing for use of only a portion of each pseudo-random sequence and rejecting transactions where the portions are the same as in a previous transaction as disclosed in the above-incorporated patent. However, in accordance with the invention, the authentication is not performed as an incident of the transaction but is performed in advance of the transaction (preferably immediately before the transaction) and authenticating data is written on the magnetic stripe 60 of the credit card structure 50 and processed through the currently existing transaction reporting and authenticating infrastructure in a manner substantially the same as currently done while providing for additional authentication data to be processed therein, as will be discussed in greater detail below, in order to provide additional security. This data could be written on the magnetic stripe of an existing credit card or on a dedicated structure 50 associated with card holder/adapter 10 and can provide additional security in connection with either. Specifically, the invention allows an ordinary credit card to be activated for only a single transaction and preferably only for a limited period of time. The invention also provides an additional degree of security of allowing the user to input a PIN number into the card holder/adapter 10 while out of close line-of-sight view of other customers or sales personnel and while the particular magnetic stripe structure 50 being activated is concealed within card holder/adapter 10.

Figure 2:
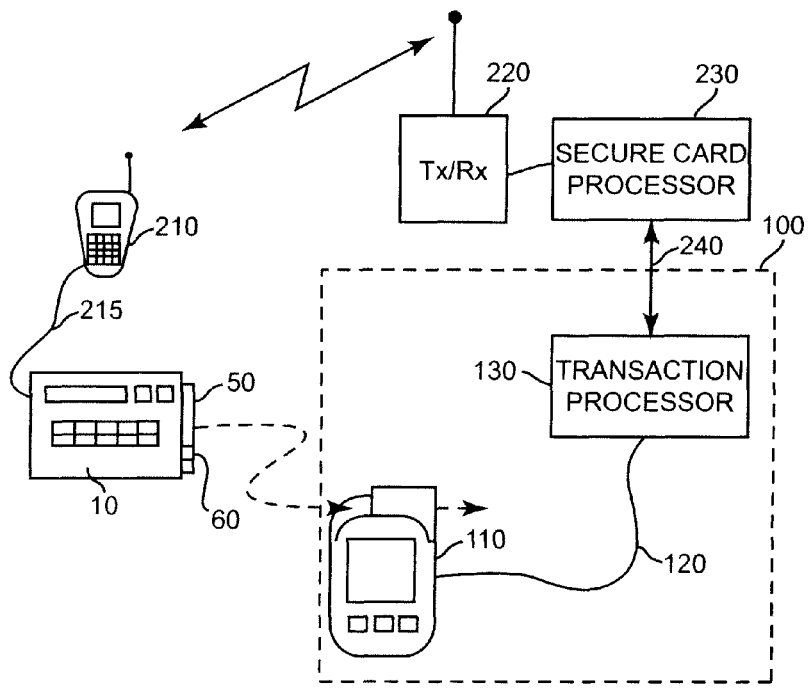
FIG. 2 is a schematic diagram of a preferred form of the system in accordance with the present invention allowing adaptation of a secure credit card to current credit card transaction reporting infrastructure.

Referring now to FIG. 2, the system in accordance with the present invention will be discussed. The currently existing transaction reporting and authentication infrastructure is generally indicated by dashed line 100 and includes at least a card reader 110, a communication link 120 (e.g. a network) and a transaction processor 130. It should also be noted that the overall system architecture forms a closed loop.

When it is desired to activate a card structure 50 for a transaction, card structure 50 is preferably first placed in card holder/adapter 10 and card holder/adapter 10 is connected to a source of external data such as a cell-phone, personal digital assistant (PDA), palm-top, laptop or desktop computer or any other wireless or wired communications device 210, preferably by a USB connection 215. The source of external data 210 then communicates through a wireless transmitter/receiver or other communication link 220 with an agent outside the secure card such as secure card processor 230 in the manner described in the above-incorporated patent but for the fact that the source of external data 210 and communication link 220 to secure card processor 230 emulate a separate authentication infrastructure which may not be fully in place. This communication link may be encrypted, if desired, to prevent capture of the card holder/adapter identification and the pseudo-random sequences but any such encryption yields little practical advantage since, as discussed in the above-incorporated patent and alluded to above, attempted use of the same portion of the pseudo-random sequences in two transactions causes the latter attempted transaction to be rejected based on the assumption that the sequences have been improperly captured. The communication between the secure card processor and the credit card holder/adapter 10 thus authenticates both the credit card holder/adapter and the user and develops unique secure transaction information (which may include either or both of the pseudo-random sequences and/or some additional unique data sequence corresponding thereto as well as the card identification number or code) which may be sent to the credit card holder/adapter (if needed) and to the transaction processor 130 of the existing transaction reporting and authentication infrastructure 100. This information is then written on the magnetic stripe 60 or the card structure 50 by magnetic head 65 (FIG. 1) either while the card is in place in the card holder/adapter 10 or as it is removed therefrom. (The former is preferred for accuracy and precision of written data format while the latter is preferred for hardware economy and simplicity.) The information is also transferred from secure card processor 230 to transaction processor 130 over communication link 240. Alternatively, the information may be provided from secure card processor 230 upon interrogation by transaction processor 130 or some combination of communications therebetween. This latter communication provides additional data supporting increased levels of security since the user is authenticated as well as the card while the function of limiting the authorization and authentication for only a single transaction and, preferably, for a limited time period (after which the ordinary credit card can be de-activated and rendered useless unless and until reactivated by a subsequent use of the card holder/adapter 10 in accordance with the invention), is also provided for ordinary credit cards. The card structure 50 now having the authenticated transaction authorization information written thereon can now be used in an existing card reader 110 in the normal and familiar current manner.

Figure 3:
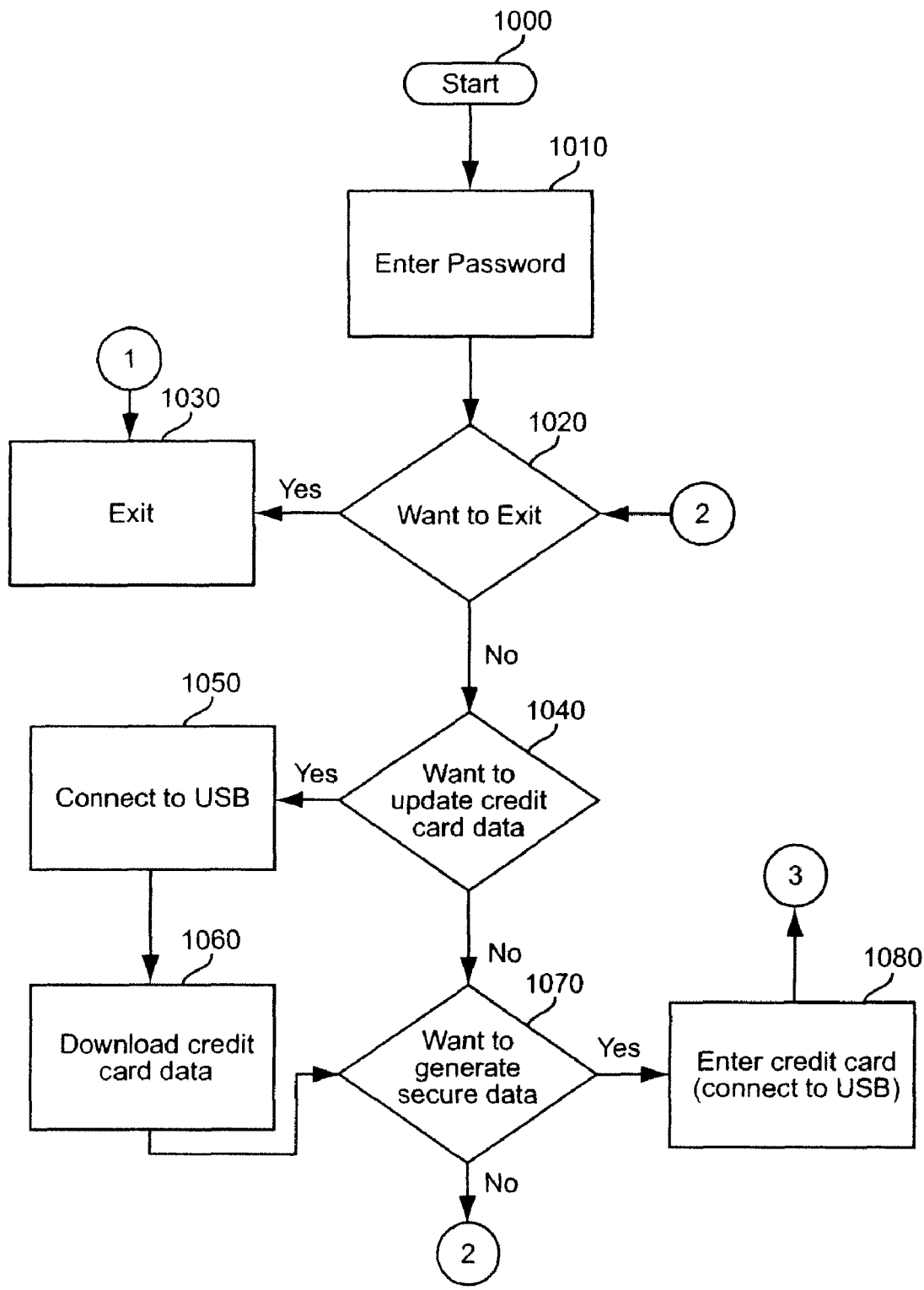
FIGS. 3 and 4 are a flow chart detailing preferred operation of the invention.
Figure 4:
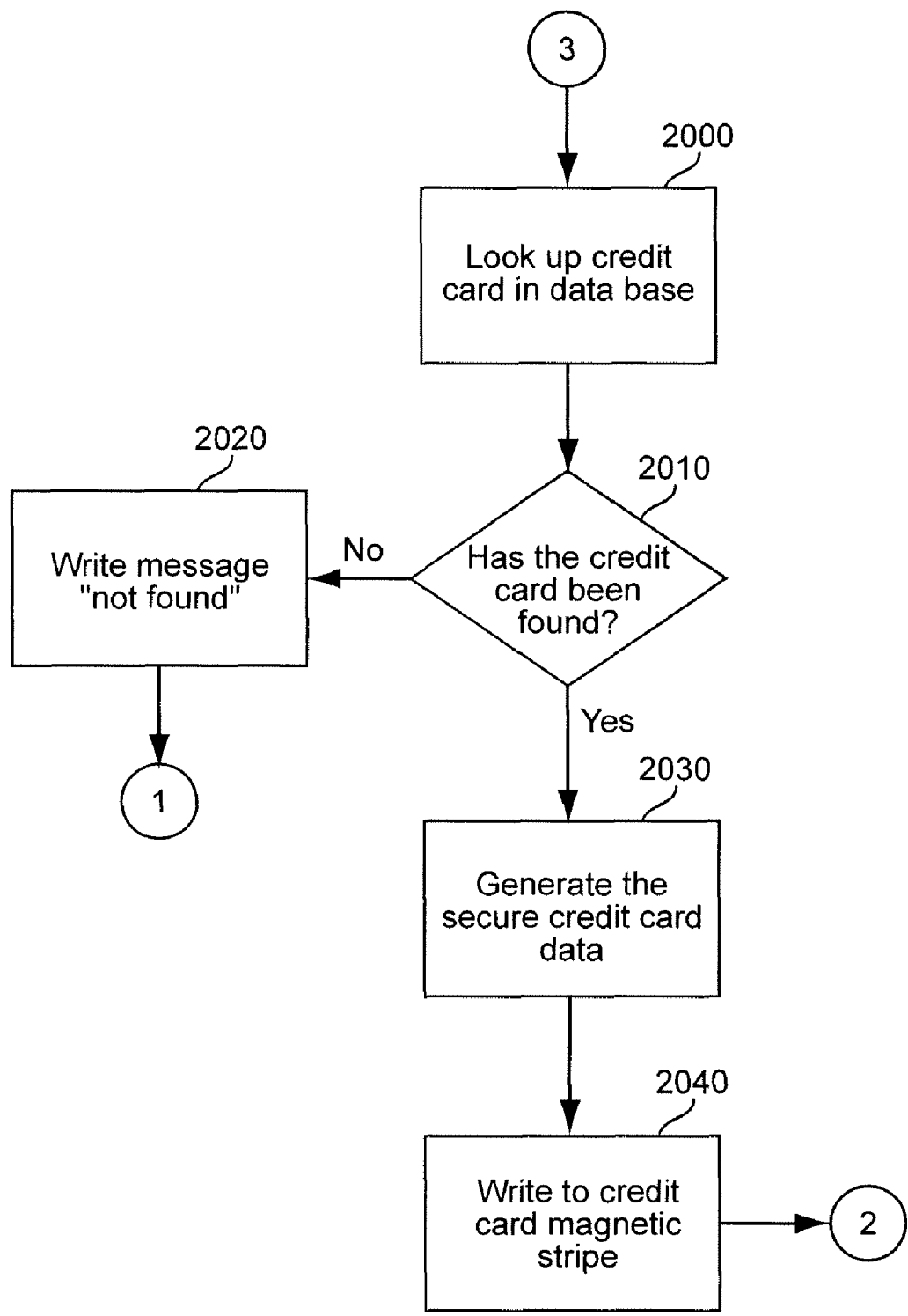

Referring now to FIGS. 3 and 4, a preferred mode of operation and some preferred perfecting features of the invention will now be discussed. This mode of operation is preferably implemented in software stored in non-volatile memory in the internal electronics 45 of the card holder/adapter 10 and may be varied or updated as desired or suitably modified for any desired application other than as a credit card as well, as alluded to above.

The process is optionally started (1000) by any desired action for which detection can be provided such as pressing the "yes" key 40 or removing and reinserting card structure 50, pressing any key 30 or the like. The user is then prompted, preferably using display 35, to enter a password such as a PIN number at step 1010, an action which can be and preferably is used to start the process. Alternatively, in view of the possibility of inadvertently actuating keys 30 or 40, steps 1000 and 1010 may be combined to provide starting of the process by entry of a password. The user is then prompted (1020) to indicate if exiting the process is desired and, if "Yes" key 40 is pressed (e.g. if the process is inadvertently started), the process exits 1030. If the "No" key is pressed, the user is asked if credit card data (e.g. of an existing conventional credit card) is to be updated. This is information which is unique to each credit card company such as Visa™, MasterCard™, American Express™ and the like and allows emulation of any such card using card structure 50, thus providing, in effect, a universal credit card. If so, as indicated by pressing "Yes" key 40, the USB port is opened which is presumably connected (215) to a source of external data 210 as discussed above and credit card data is downloaded. This credit card data is the protocol data and formatting which each respective credit card company is expecting for their data but does not reflect any information specific to any particular account. Particular account information is (initially) available from the existing credit card and can be stored in the credit card holder/adapter 10 from which it can thereafter be placed on card structure 50. The process then continues with step 1070 which allows writing of this information to a conventional credit card or card structure 50 at step 2040 together with secure transaction data generated at step 2030 as will be discussed in detail below.

However, if the user wishes to emulate a particular credit card using card structure 50 as a universal credit card for a particular account after performing steps 1050 and 1060, the user would press the "No" key 40 at the prompt corresponding to step 1040 and proceed to step 1070 which provides the option of exiting the process through cardinal point 2. This option might be taken when the user decides against completing the transaction. However, if the user indicates a desire to generate secure data and activate the card structure 50 (or write secure data to a conventional credit card), the card structure 50 (or conventional credit card) is inserted into the card holder/adapter 10 if not already in place, the card to be emulated or written to is entered using keys 30 if not already written to the card structure 50, account-specific information is read from internal memory of the card holder/adapter 10 and the USB port is opened to connect card holder/adapter 10 to the source of external data 210.

The process continues with step 2000 (as indicated by cardinal point 3 and a database in secure card processor 230 (FIG. 2) is searched for account information for the credit card. The database is preferably keyed by the name of the credit card company and contains account-specific information as well as the expected data format. If account-specific information is not found at step 2010, The user is notified at step 2020 through display 35 and the process unconditionally exits. If the corresponding account specific information is found, secure data is generated in step 2030 in the same manner as disclosed in the above-incorporated patent including the two synchronized pseudo-random sequences and the secure identification of the card holder/adapter 10 (corresponding to the secure credit card identification in the above-incorporated patent). Once this information is generated, which may also include other or alternative information such as authentication or confirmation information or code, some additional data sequence corresponding to a pseudo-random sequence, protocol data and formatting, as noted above, the information so generated in step 2030 (and steps 1050 and 1060, if performed) is written to card structure 50 at step 2040 in the format required by the card type or issuer name as downloaded or read from the memory of the holder/adapter 10 and the process loops to step 1020 to allow secure activation of another card, if desired, or for the user to exit the process. The card structure 50, whether a universal card that can emulate any type or issuer name of credit card or an existing credit card having enhanced security by virtue of the additional secure data provided by the invention, can now be used in the normal manner in a desired transaction using card reader 110. When the secure data is read and transmitted to transaction processor 130, transaction processor 130 may compare the information with any information, such as an authentication code, received from secure card processor 230 or may send data such as the pseudo-random sequences and the card holder identification to the secure card processor 230 for confirmation of prior authentication or a combination of both over communication link 240.

In view of the foregoing, it is clearly seen that the invention provides an adapter to allow the meritorious effects of the secure credit card of the above-incorporated patent to be achieved using existing transaction reporting and authorization infrastructure as well as providing a universal card to emulate any existing credit card to enhance convenience and to compensate for any additional bulk of the card holder/adapter 10 when it is carried. The invention also provides security enhancements for existing credit cards and a transitional system between the existing transaction reporting and authorization infrastructure and a secure infrastructure optimized in regard to the secure credit card of the above-incorporated patent.

While the invention has been described in terms of a single preferred embodiment, those skilled in the art will recognize that the invention can be practiced with modification within the spirit and scope of the appended claims.

We claim:

1. A method of writing secure information to a machine-readable medium of a card prior to performing a secure transaction, said method comprising steps of authenticating a user to a secure card adapter, reading account-specific information from memory of said secure card adapter or from a machine readable medium on a card inserted into said secure card adapter, generating, from a secure card processor or a transaction processor, authenticating information including information other than account-specific information and personal identification information, said authenticating information further including at least one of an additional unique data sequence, protocol data and formatting or confirmation information or code, said generating step being performed responsive to said authenticating and reading steps for performing a single secure transaction, transferring said authenticating information from said secure card processor to said transaction processor located where said single secure transaction is performed and to said secure card adapter, and writing at least said authenticating information for performing said single secure transaction on a machine readable medium of a card using said secure card adapter.

2. A method as recited in claim 1, including the further step of searching a database for data corresponding to said account-specific information.

3. A method as recited in claim 1, including a further step of downloading format data for said information for performing a secure transaction from a source of external data to said secure card adapter for use in said writing step.

4. A method as recited in claim 1, wherein said writing step is responsive to data derived by processing outputs of two synchronized pseudo-random number generators.

* * * * *